Feb. 5, 1935.  H. BAEHR ET AL  1,990,217
SEPARATION OF HYDROGEN SULPHIDE FROM GASEOUS MIXTURES CONTAINING THE SAME
Filed June 18, 1932   2 Sheets-Sheet 1

INVENTORS
HANS BAEHR
HELMUT MENGDEHL.
BY
Hauff & Warland.
ATTORNEYS.

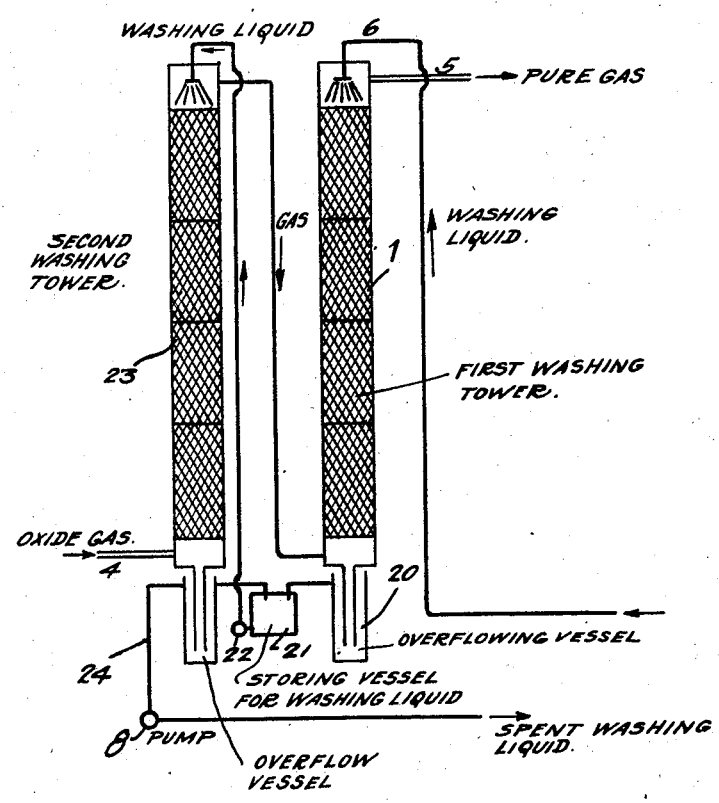

Patented Feb. 5, 1935

1,990,217

UNITED STATES PATENT OFFICE 1,990,217

SEPARATION OF HYDROGEN SULPHIDE FROM GASEOUS MIXTURES CONTAINING THE SAME

Hans Baehr and Helmut Mengdehl, Ludwigshafen-on-the-Rhine, Germany, assignors to I. G. Farbenindustrie Aktiengesellschaft, Frankfort-on-the-Main, Germany Application June 18, 1932, Serial No. 618,081
In Germany June 20, 1931

17 Claims. (Cl. 23—2)

The present invention relates to improvements in the separation of hydrogen sulphide from gaseous mixtures containing the same.

It is already known that gaseous weak acids such as carbon dioxide, hydrogen sulphide, hydrocyanic acid and the like, may be recovered from gases containing the same, such as water gas, waste gases from the destructive hydrogenation or other industrial gases, by washing the gases with organic bases such as di-ethanolamine and tri-ethanolamine and expelling the combined weak acids from the said bases by heating. This process has the drawback that on account of the high vapor tension of the solution enriched in hydrogen sulphide a complete washing out of the hydrogen sulphide from the gases is very difficult. Moreover, the organic bases are volatile, and therefore losses, which have a considerable influence on the economy of the process, are incurred both in washing the gases and in expelling the weak acids.

We have now found that hydrogen sulphide, if desired together with other weak gaseous or vaporous (hereinafter referred to as "vaporized") acids of the aforesaid kind, can readily be washed out from gases containing the same by aqueous liquids which contain organic acids in combination with strong inorganic bases. As such bases may be used alkalies or alkaline earths which may initially be present in the form of their salts with the said organic acids. Preferably said liquids are passed through a circulatory system in which after contact with the said gases they are freed from the hydrogen sulphide, are thus recovered into their original condition and then again brought into contact with the gases to be washed. The hydrogen sulphide and, if present, also the other weak vaporized acids can be expelled from these liquids still having an alkaline reaction by heat, whereby they are recovered in a concentrated form and may be easily worked up in any desired manner.

The nature of the organic acids employed depends on the strength of the weak vaporized acid which, besides hydrogen sulphide, are to be recovered, and, generally speaking, the electrolytic dissociation of the organic compound in the cold should be about the same as, or slightly less than, that of the weak vaporized acid to be recovered. The disassociation in the warm should be greater than that of the vaporized acid to be recovered, so that the latter is expelled on heating. Besides the electrolytic dissociation the low degree of volatility of the organic acids as compared with the volatility of the absorbed vaporized acids also makes them suitable for expelling the latter while heating. The following organic acids may be mentioned by way of example; amino-sulphonic acids, such as amino-benzene-sulphonic and amino-naphthalene-sulphonic acid, taurine, other amino acids, such as glycocoll, alanine, anthranilic acid and its derivatives, such as acetyl-anthranilic acid, nitro- and chlorobenzoic acid, aromatic carboxylic acids, phthalic acid and its derivatives, weak aliphatic mono- and di- carboxylic acids or imino acids, such as imino-dipropionic acid. The hydroxides, oxides, carbonates, formates and the like, of sodium, potassium, lithium, barium, calcium, strontium, magnesium and beryllium, may serve as the bases. The sodium and potassium salts of glycocoll, aspartic acid, and acetylanthranilic acid are especially suitable. Mixtures of several of the said organic acid substances may also be employed.

These aqueous liquids at ordinary temperature and pressure, depending on the concentration therein of the dissolved substances, absorb up to more than sixty times their volume of hydrogen sulphide and when heated give it up again practically completely. In order to avoid the formation of precipitates in the washing solution enriched with the weak vaporized acids, in particular with carbon dioxide, it is preferable to maintain a nearly equivalent ratio of the amounts of organic acids on the one hand and of the inorganic bases such as alkalies or alkaline earths on the other hand. This ratio, however, need not be maintained if carbon dioxide is not present or present only in small amounts in the gases to be freed from the weak gaseous or vaporous acids. Thus for example when washing out hydrogen sulphide from a gas in which only relatively small amounts of carbon dioxide are present, the washing liquid may contain an excess of alkalis or alkaline earths over the organic acids contained therein without precipitation taking place, since the reaction products formed are soluble even in great concentration.

It is of advantage to employ mixtures of several alkali metal or earth alkaline metal salts of weak organic acids since in this manner the formation of precipitates in the washing liquid such as takes place for example when absorbing hydrogen sulphide together with carbon dioxide in a highly concentrated solution of the sodium salt of alanine, is avoided. In this manner not only the premature formation of a precipitate in the washing liquid is prevented but also the speed of absorption is enhanced. It is of particular advantage to employ mixtures of such of the aforesaid substances, of which the single constituents are homologues, or mixtures of one or more amino fatty acids with one or more imino fatty acids or mixtures of amino acids obtained by the degradation of albumen by fermentation or by the action of acid or basic substances.

The results obtained when washing out the aforesaid weak vaporized acids, in particular if carbon dioxide is present besides hydrogen sulphide, are considerably enhanced when the washing treatment is carried out at elevated temperatures which, however, should preferably not be higher than 90° C. At elevated temperatures the speed of the hydration of the carbon dioxide which materially influences the speed of absorption, is considerably higher than at ordinary temperatures. The vapor tension of the weak vaporized acids, in particular of the carbon dioxide, in the washing liquid enriched therewith, on the other hand, rises only slowly when raising the temperature and strongly increases only in the neighbourhood of the boiling point of the washing liquid.

It has been found that if hydrogen sulphide is present in the gases to be purified together with carbon dioxide, it is possible to wash out these weak acids separately when employing elevated temperatures. Thus for example carbon dioxide may be first washed out from a gas, the other weak vaporized acids such as hydrogen sulphide first remaining in the gas and being removed in a subsequent washing treatment at ordinary temperature.

The separate washing out of weak gaseous or vaporous acids, as for example of hydrogen sulphide and carbon dioxide may also be effected in inverse sequence. Thus for example, substantially only hydrogen sulphide is removed in a first washing device at a great speed of the treated gas and while passing through only relatively small amounts of washing liquid, thereby only small amounts of carbon dioxide being absorbed, while in a second washing device the carbon dioxide is washed out at an elevated temperature. The order of washing out the weak vaporized acids depends on the content in the gas of the said weak acids and on the further use of these acids.

When employing strongly concentrated washing liquids of the nature described, solid salts formed from the weak vaporized acids and the alkalies or alkaline earths are liable to be precipitated when the liquids are allowed to stand for a considerable time after the saturation with carbon dioxide. These precipitates may easily give rise to disturbances in the operation such as clogging up of the apparatus and also to change of the composition of the washing liquid. When the washing solutions are low in alkalies or alkaline earths the capacity of absorption of the latter diminishes. These inconveniences can be avoided if the absorption liquid is kept in circulation between one or more washing towers and one or more regenerators, cooling devices being arranged at suitable places in the circulatory system. When proceeding in this manner the time during which the washing liquid is in the washing towers is not sufficient for the formation of solid precipitates and if these are formed they have no chance of depositing since they are immediately carried off by the washing liquid into the regenerator in which they are decomposed. To this end it is preferable to adjust and arrange the containers balancing the level of the liquids in the towers and which are necessary for continuously carrying on the operation, in such a manner that the liquid as far as possible remains in perpetual movement. For this purpose it is of advantage to employ as regenerating apparatus columns in which the prewarmed solution is allowed to trickle down and contacted with steam passed in counter-current thereto, the solution thus remaining in perpetual movement.

Apart from the danger of precipitation of solid salts it is preferable to employ strongly concentrated washing liquids since with these a considerably more rapid absorption of the vaporized weak acids it attained.

The present invention will now be further described with reference to the accompanying drawings of which Figure 1 shows in a somewhat diagrammatic manner an elevation, partly in section, of apparatus in which the washing treatment may be carried out with particular advantage. Figure 2 shows a particular arrangement in which the gases to be purified are successively washed in two washing towers. It is, however, to be understood that the invention is not restricted to the use of the particular arrangements shown in these drawings.

The most important parts of the apparatus shown in the said Figure 1 are the washing tower 1, the devices 12 and 9 for regenerating the washing liquid, the heat exchanger 3 and the requisite pipes and connections for the passage of the gas, the washing liquid, the water and the steam.

The gas to be purified is introduced into the washing tower 1 at 4 and leaves the tower at 5. The said tower is preferably lined with ceramic material and filled with Raschig rings. The washing liquid is introduced into the tower through a spraying device 6 and after absorbing during its passage downwards through the tower the hydrogen sulphide and other weak acids contained in the gas to be purified it collects at the bottom 7 of the tower from which it is conveyed by means of a pump 8 through a heat exchanger 3 into the expelling vessel 9. In the heat exchanger the washing liquid is heated to about 80° C. and in vessel 9 it is heated to boiling the greatest part of the absorbed weak vaporized acid thereby being expelled and escaping through pipe 10. The hot washing liquid overflowing at 11 is brought into a tower 12 preferably lined with ceramic material and filled with Raschig rings in which said liquid is brought into direct contact with steam introduced at 13. In this manner the washing liquid is freed practically completely from the absorbed weak vaporized acids. These weak acids escaping together with the steam are combined at 14 with those drawn off from the expelling vessel 9 and then freed from the steam by direct contact with cold water supplied from 16 in cooler 15. The weak vaporized acids freed from steam may then be further worked up in any desired manner. The hot washing liquid collecting at the bottom 17 of tower 12 is then passed by means of pump 18 through the heat exchanger 3 and thereupon through the cooler 19 in which the said liquid is brought to the temperature which it should have in the washing operation in washing tower 1 to which it is recycled.

The arrangement described has the advantage that the solution is kept in perpetual movement so that a precipitation of solid salts either does not occur at all or, if it does occur, no solid salt is deposited at any part of the apparatus. Furthermore, in this operation large amounts of gas can be purified with small amounts of washing liquid which makes possible a saving of the steam for expelling the absorbed gas. Moreover, the expenses for constructing the regenerator system described are relatively small.

The washing out of the weak vaporized acids which are absorbed more slowly by the washing liquid is preferably effected in two washing towers arranged in series as is shown for example in Figure 2 of the accompanying drawings. According to this modification the regenerated washing liquid is introduced into the first washing tower 1 by means of a spraying device 6 and after passage through this tower it collects in an overflow vessel 20 and is then directed to storing vessel 21. From thence the washing liquid is conveyed by means of pump 22 into the second washing tower 23. After passage through this tower part of the washing liquid flows back into the storing vessel 21 and thus is brought again into washing tower 23 while depending on the conditions of the washing treatment another part of the washing liquid is pumped by means of pump 8 through pipe 24 and then treated in a regenerating system similarly as described with reference to Figure 1. This arrangement involves the advantage that the washing liquid corresponding to the amount passed through the first washing tower is enriched to a great extent with the weak vaporized acids to be absorbed and that by this the absorptive capacity of the washing liquid is fully made use of. In this manneer a considerable saving of steam with reference to the amount of gas to be treated is attained.

It is known that alkaline liquids strongly corrode lead and aluminium but attack iron only slightly. Contrary to expectation we have found that by the above mentioned alkaline washing liquids for removing weak vaporized acids from gases iron is considerably attacked but that lead, in particular hard lead, chromium nickel steel are not or at the most only slightly corroded. The stability of these metals is increased by the presence of the hydrogen sulphide. It has been found that in the presence of the said hydrogen sulphide the attack of the washing liquids is completely prevented so that even iron may be employed as constructional material. It is also of advantage to avoid the presence of chlorine in any form, as for example in the form of sodium chloride, since otherwise the walls of the vessels coming into contact with the solution having a basic reaction are very liable of being corroded, especially if the vessels are constructed of iron. Thus for example when preparing the amino-acid from halogenated fatty acids, such as chloroacetic acid, products are formed which cannot be made use of as such. They are preferably purified before use. However, it is more recommendable to start from agents free from chlorine when producing the agents to be used for the preparation of the washing liquids. Lead, aluminium and V2A-steel are more stable, in particular if hydrogen sulphide is present in the gas to be purified, but they are also corroded after some time.

A washing liquid enriched in carbon dioxide and hydrogen sulphide gives off more quickly the hydrogen sulphide than the carbon dioxide when heated. This fact makes it possible without further operation to obtain a high percent hydrogen sulphide even when washing out carbon dioxide and hydrogen sulphide at the same time. On the other hand the carbon dioxide escaping from the expelling devices in admixture with hydrogen sulphide can also be removed subsequently by treatment with an aqueous paste of calcium hydroxide or a carbon dioxide may be recovered in a pure state by treatment with bog iron ore or other masses binding hydrogen sulphide.

The advantage of the process according to the present invention over that already known is that the organic acids employed in the absorption liquor are present in a non-volatile form, so that no losses are incurred during the absorption and expelling the weak vaporized acids. Moreover, the weak vaporized acids are expelled in a very short time by heating, so that only a small application of heat is needed.

The washing treatment according to the present invention may, of course, also be carried out under elevated pressures.

The following examples will further illustrate the nature of the said invention but the invention is not restricted thereto.

*Example 1*

Producer gas, containing 4 per cent by volume of carbon dioxide and 1 per cent by volume of hydrogen sulphide, is irrigated, at ordinary temperature, with an aqueous solution containing a mixture of 20 per cent of sodium alanine and 10 per cent of sodium glycocoll, 100 cubic centimeters of solution being employed per 60 liters of gas. The carbon dioxide and hydrogen sulphide are absorbed by the washing liquor. This liquor having still a slightly alkaline reaction is then heated to boiling for about 3 minutes, thus expelling the carbon dioxide and hydrogen sulphide. The regenerated washing liquor can be used again for purifying the gas.

*Example 2*

An aqueous solution containing 400 grams of sodium glycocoll per liter is caused to trickle at room temperature and under atmospheric pressure in counter-current through coke oven gas containing 0.53 per cent by volume of hydrogen sulphide, 0.1 per cent by volume of cyanogen compounds and 1.5 per cent by volume of carbon dioxide per cubic meter. About 1 liter of the washing liquor is employed per cubic meter of gas. The gas leaving the washer is practically free from hydrogen sulphide, carbon dioxide and cyanogen compounds. The absorption liquor leaving the washer is heated to the boiling point as described in Example 1, whereby the hydrogen sulphide and the carbon dioxide absorbed are expelled practically completely. The cooled liquor is employed again for the removal of hydrogen sulphide and carbon dioxide from gases.

*Example 3*

Waste gases from the destructive hydrogenation containing 35 grams of hydrogen sulphide per cubic meter are trickled with a 34 percent aqueous solution of calcium alanine. About 1.5 liters of washing liquid are employed per cubic meter of gas. The gas leaving the washing liquid contains less than 0.2 gram of hydrogen sulphide per cubic meter. The waste washing liquid is heated to the boiling point by means of heat exchange with absorption liquids from which the absorbed gas has previously been expelled. The liquor is then cooled and employed again for the purification of gases. Part of the hydrogen sulphide escaping during the regeneration of the washing liquid is compressed and filled in bombs. Another part is burned with air to form sulphur according to Claus' process or with a greater amount of air to form a sulphur dioxide which may be further worked up to sulphuric acid.

Example 4

A gas obtained by the dry distillation of brown coal and which contains 21 per cent of carbon dioxide and 2 per cent of hydrogen sulphide is rinsed with a washing liquid containing 30 per cent of sodium alanine and 8 per cent of potassium glycocoll. 3 liters of washing liquid are employed per each cubic meter of gas. The gas leaving the washing vessel still contains 6.8 per cent of carbon dioxide and 0.2 gram of hydrogen sulphide per cubic meter. The waste washing liquid which contains no precipitated salts is heated up to boiling while making use of the content of heat of another charge of washing liquid from which the absorbed gases have already been expelled. In this manner the greater portion of carbon dioxide and hydrogen sulphide escapes whereupon by blowing steam into the washing liquid the remainder of the carbon dioxide and hydrogen sulphide is expelled. The regenerated liquid is cooled and then employed again for the removal of carbon dioxide and hydrogen sulphide from fresh amounts of gases.

Example 5

An aqueous solution containing 20 per cent of the sodium salt of alanine and 5 per cent of sodium carbonate is caused to trickle through waste gases from the destructive hydrogenation which contain about 40 grams of hydrogen sulphide per cubic meter and 0.6 per cent by volume of carbon dioxide. About 1.5 liters of washing liquid are employed per each cubic meter of gas. The gas leaving the washing vessel contains less than 0.25 gram of hydrogen sulphide per cubic meter and no carbon dioxide. The washing liquid flowing down from the washing vessel is regenerated as described in Example 3. The escaping hydrogen sulphide may be further worked up in any desired manner.

Example 6

A mixed gas obtained by the dry distillation of brown coal and which contains 23 per cent by volume of carbon dioxide and 5 per cent by volume of hydrogen sulphide is treated at a temperature of 65° C. in two washing towers arranged in series with an aqueous solution containing a mixture of 20 per cent of sodium alanine and 10 per cent of sodium glycocoll. In the second washing tower about 10 liters of washing liquid are employed per each cubic meter of gas. The liquid used in this tower is passed to the first tower to which it is recycled several times. From this tower the same amount of liquid is withdrawn which is supplied to the second tower and is then heated to boiling whereby the absorbed carbon dioxide and part of the absorbed hydrogen sulphide is expelled practically completely. The gas leaving the washing towers contains about 0.8 per cent of carbon dioxide and about 4.0 per cent of hydrogen sulphide. The gas is then treated at ordinary temperature with a washing liquid of the same composition, 1.2 liters of washing liquid being employed per each cubic meter of gas. The gas leaving this washing device still contains about 200 milligrams of sulphur per cubic meter and 0.4 per cent of carbon dioxide. The washing liquid charged with hydrogen sulphide is regenerated by heating, the escaping hydrogen sulphide being worked according to Claus' process or worked in any other desired manner.

Example 7

A gas obtained by the dry distillation of brown coal which contains about 1 per cent by volume of hydrogen sulphide, 16 per cent by volume of carbon dioxide is treated at ordinary temperature in a washing vessel with an aqueous solution as described in Example 6. 1 liter of this solution is employed per each cubic meter of gas. The gas leaving the washing vessel still contains 250 milligrams of sulphur per cubic meter and 14.7 per cent by volume of carbon dioxide. The solution flowing down from the washing vessel is heated to boiling while making use of the content of heat of a prior charge of washing solution whereby the hydrogen sulphide escapes. This hydrogen sulphide can be employed in any desired manner for example for the preparation of sulphuric acid by combustion to sulphur dioxide. In a second washing system consisting of two washing towers arranged in series the gases are treated at 65° C. as described in Example 6, 7.5 liters of a washing liquid being employed per each cubic meter of gas. The gas leaving these washing towers still contains 0.3 per cent of carbon dioxide and 100 milligrams of hydrogen sulphide per each cubic meter. The washing liquid flowing down from the washing tower is regenerated by heating and then employed again for washing.

Example 8

An aqueous solution containing 10 per cent of sodium glycocoll and 20 per cent of sodium alanine is caused to trickle at a temperature of 60° C. through blast-furnace gases which after being freed from dust contain 12 per cent by volume of carbon dioxide and 0.5 per cent of hydrogen sulphide. About 10 liters of acid solution are employed per each cubic meter of gas. The gas leaving the washing vessel contains less than 0.1 per cent of carbon dioxide and 0.3 gram of hydrogen sulphide per cubic meter. The washing liquid enriched in carbon dioxide and hydrogen sulphide is allowed to trickle down through a tower filled with Raschig rings through which another part of the hot gases freed from dust is passed in counter current, the carbon dioxide and the hydrogen sulphide thus being expelled from the solution. The solution cooled to 60° C. is employed again for washing.

When in the appended claims we use the expression "organic acid" in connection with the definition of the absorption liquids, it is to be understood that what we mean thereby is an acid in the proper sense of the word, i. e. a compound containing a carboxylic or sulphonic acid group, but not such substance as a phenol which is often improperly called an acid.

What we claim is:

1. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide.

2. A process for the separation of hydrogen sulphide and at least one further weak vaporized acid from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide and of said weak vaporized acid.

3. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, the electrolytic dissociation of which is slighter than that of hydrogen sulphide at ordinary temperature but greater than that of hydrogen sulphide at an elevated temperature.

4. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, whereby the hydrogen sulphide contained in said gas is absorbed by said liquid, continuously withdrawing from contact with the said gas liquid containing absorbed hydrogen sulphide, then expelling the absorbed hydrogen sulphide from this liquid and washing a fresh amount of gas with the latter.

5. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an about equivalent amount of an organic acid, of which the electrolytic dissociation in the cold does not substantially exceed that of hydrogen sulphide.

6. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with a mixture of organic acids, of which the electrolytic dissociation in the cold does not substantially exceed that of hydrogen sulphide.

7. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid selected from the group consisting of amino acids and derivatives thereof.

8. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with a mixture of organic acids of which one component is an amino acid, the other component being selected from the group consisting of amino acids, different from said amino acid, imino acids, sulphonic acids and derivatives of the said acids.

9. A process for the separation of hydrogen sulphide from a gas containing the same which comprises washing said gas at ordinary temperature with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, whereby the hydrogen sulphide contained in said gas is absorbed by said liquid, continuously withdrawing from contact with the said gas liquid containing absorbed hydrogen sulphide, then expelling at an elevated temperature the absorbed hydrogen sulphide from this liquid and washing a fresh amount of gas with the latter.

10. A process for the separation of hydrogen sulphide from a gas containing the same which comprises washing said gas at an elevated temperature not exceeding 90° C. with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide.

11. A process for the separation of hydrogen sulphide and carbon dioxide from a gas containing the same which comprises washing said gas at an elevated temperature not exceeding 90° C., with an aqueous liquid in which the carbon dioxide is bound by a strong inorganic base, selected from the group consisting of alkalies and alkaline earths in combination with an organic acid, of which the electrolytic dissociation in the cold does not substantially exceed that of carbon dioxide, the bulk of carbon dioxide thereby being absorbed, and then in the second stage washing the remaining gas at ordinary temperature with a liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, the hydrogen sulphide thus being dissolved.

12. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, whereby the hydrogen sulphide contained in said gas is absorbed by said liquid, continuously withdrawing from contact with the said gas liquid containing the absorbed hydrogen sulphide, then expelling the absorbed hydrogen sulphide from this liquid and washing a fresh amount of gas with the latter, the entire liquid being kept in constant movement.

13. A process for the separation of hydrogen sulphide from a gas containing the same which comprises washing said gas in several stages with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide.

14. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, whereby the hydrogen sulphide contained in said gas is absorbed by said liquid, continuously withdrawing from contact with the said gas liquid containing the absorbed hydrogen sulphide, then expelling by indirect heat exchange with a hot liquid the absorbed hydrogen sulphide from this liquid and washing a fresh amount of gas with the latter.

15. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, whereby the hydrogen sulphide contained in the said gas is absorbed by said liquid, continuously withdrawing from contact with the said gas liquid containing the absorbed hydrogen sulphide, then expelling by direct contact with steam the absorbed hydrogen sulphide from this liquid and washing a fresh amount of gas with the latter.

16. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, while confining the treated gas by a material selected from the group consisting of lead, chromium-nickel steel and aluminium.

17. A process for the separation of hydrogen sulphide from a gas containing the same which comprises washing said gas with an aqueous liquid in which the hydrogen sulphide is bound by a strong inorganic base selected from the group consisting of alkalies and alkaline earths in combination with an organic acid, of which the electrolytic dissociation in the cold does not substantially exceed that of hydrogen sulphide, while avoiding the presence of substances comprising chlorine.

HANS BAEHR.
HELMUT MENGDEHL.